United States Defensive Publication [19] (H) [11] T962,005

Breault et al. [43] Sept. 6, 1977

[54] SIMPLY INSTALLED FLOOR TILE

[75] Inventors: Homer Breault, Pine Glen; Alvin E. Witt, both of Media, Pa.

[73] Assignee: Atlantic Richfield Company, Los Angeles, Calif.

[21] Appl. No.: 780,551

[22] Filed: Mar. 23, 1977

Related U.S. Application Data

[63] Continuation of Ser. No. 651,680, Jan. 23, 1976, abandoned.

[51] Int. Cl.[2] ..... E04F 15/10

[52] U.S. Cl. ..... 156/71; 156/94; 428/46; 428/201; 428/203; 428/205; 428/337; 428/339; 428/425

[57] ABSTRACT

Instead of following the conventional practice of removing the previous floor covering of sheet linoleum, floor tiles or the like, the floor tiles of the present invention are so remarkably thin that they are laid on top of the old flooring while still providing adequate clearance for doors, drawers, and related items imposing limits on the floor elevation. The principal layer has a thickness of organic composition from 0.005 inch (5 mils) to 0.040 inch (40 mils) and the cured transparent polyurethane top layer is at least 0.001 inch (1 mil) and not more than 10 mils in thickness. The combination of principal layer and top layer has a thickness from 0.010 to 0.045 inch. By keeping the flooring so thin, its usefulness for installation over existing flooring without exceeding the available clearance is enhanced.

1 Claim, No Sheets Drawing,

9 Pages Specification

The file of this unexamined application may be inspected and copies thereof may be purchased (849 O.G. 1221, Apr. 9, 1968).